United States Patent [19]

Devlin et al.

[11] 3,742,583
[45] July 3, 1973

[54] METHOD OF USING TWIST-OFF NUT TO ASSEMBLE A JOINT

[75] Inventors: John O. Devlin, Jenkintown; William Matievich, Hatboro, both of Pa.

[73] Assignee: Standard Pressed Steel Co., Jenkintown, Pa.

[22] Filed: Jan. 14, 1972

[21] Appl. No.: 218,039

Related U.S. Application Data

[62] Division of Ser. No. 42,230, June 1, 1970, abandoned.

[52] U.S. Cl............... 29/413, 29/458, 29/446, 29/526, 85/61, 151/7, 287/189.36 F, 287/189.36 J
[51] Int. Cl............................................. B23p 17/00
[58] Field of Search............ 29/413, 458, 446, 29/526; 85/61, 1 JP; 287/189.36 F, 189.36 J; 151/21 C, 7

[56] References Cited
UNITED STATES PATENTS

| | | | |
|---|---|---|---|
| 2,718,691 | 9/1955 | Sussenbach | 29/526 |
| 3,339,003 | 8/1967 | Cessna | 29/458 X |
| 3,370,341 | 2/1968 | Allsop | 29/413 |
| 3,444,775 | 5/1969 | Hills | 85/61 |
| 3,482,864 | 12/1969 | Bynum | 85/61 X |
| 3,602,976 | 9/1971 | Grube | 29/413 X |

FOREIGN PATENTS OR APPLICATIONS 854,792  11/1960  Great Britain.......................... 85/61

*Primary Examiner*—Charles W. Lanham
*Assistant Examiner*—V. A. Dipalma
*Attorney*—Andrew L. Ney, Robert Seitter et al.

[57] ABSTRACT

A nut especially adapted for use with joints including a sealant comprises a nut portion having a bearing face, a threaded bore and an external wrenching configuration connected to a collar portion having a free end face, a bore and an external wrenching configuration by a neck portion adapted to rupture at a predetermined torque. To assemble a joint including a sealant, the nut is threaded onto the threaded portion of a mating bolt by applying torque to the wrenching configuration on the nut portion and the joint is allowed to settle so that the sealant re-distributes itself under the load imposed by the nut; thereafter, the nut is re-tightened on the bolt by applying torque to the wrenching configuration of the collar portion. When a predetermined torque is reached, the neck ruptures and the nut and collar portions are separated.

1 Claim, 4 Drawing Figures

PATENTED JUL 3 1973 3,742,583

METHOD OF USING TWIST-OFF NUT TO ASSEMBLE A JOINT

This is a division, of application, Ser. No. 42,230 filed June 1, 1970, now abandoned.

In many structural joints, it has become common to provide a sealing agent in and around the fastener hole as well as between the faying surfaces of the workpieces to be joined. Once the joint is assembled, the sealant covers the surface of the hole and/or the faying surfaces of the workpieces and prevents moisture from entering the joint. Thus, the joint is protected from corrosion.

One problem resulting from the use of sealants results from the settling of the joint that occurs once the fastener assembly that secures the joint has been tightened. By settling of the joint is meant the movement of the workpieces and sealant that takes place during the period of relaxation that occurs after the fastener assembly has been tightened and the clamp load induced in the joint. The induced clamp load causes the sealant to flow and redistribute itself in the joint and causes movement of the workpieces and of the fastener elements away from one another so that the induced clamp load is reduced.

Accordingly, when using sealants in a joint, resort has been made to the use of a fastener assembly including a female fastener having a nut body connected to a first collar by a first neck adapted to rupture at a predetermined torque. A second collar is connected to the first collar by a second neck adapted to rupture at a predetermined torque lower than the predetermined torque at which the first neck is adapted to rupture. In use, the nut is assembled on the bolt by applying torque to the second collar until that collar breaks away from the first collar; thereafter, the joint is allowed to settle and the nut is again tightened to the bolt by applying torque to the first collar until that collar breaks away from the nut body. At this point, the nut is fully seated and the joint is finally assembled. However, it can be seen that the torque applied to the collars never exceeds the desired torque to be applied to the joint. Accordingly, the highest clamp load acting on the sealant is applied when the nut is finally assembled, and, therefore, further settling of the joint occurs which leads to a loss of the desired clamp load.

It is an object of this invention, therefore, to provide a nut that cooperates with a bolt to assemble a joint without losing the clamp load in the joint due to the settling of the joint.

It is yet another object of this invention to provide a nut having a twist-off collar that is economical to make.

It is still another object of this invention to provide a method of assembling a joint including a sealant that is simple, economical, and that retains the desired clamp load in the joint.

These and other objects of this invention are accomplished by providing a female fastener having a nut portion and a collar body portion each including a wrenching configuration. A central opening extends axially through the nut portion and the collar portion and is threaded in the area of the nut portion so as to cooperate with a bolt to assemble a joint. Connecting the nut portion and the collar portion is a neck adapted to rupture or shear upon the application of a predetermined torque to the collar section, which torque is equal to the torque with which the joint is to be finally assembled. To assemble a joint, torque is applied to the wrenching configuration on the nut portion to assemble the nut on a bolt with a torque higher than the predetermined torque with which the joint is to be finally assembled; thereafter, the joint is allowed to settle so that the sealant flows to its cured configuration. During the settling period, the prevailing torque between the nut and the bolt drops and is lower than the predetermined torque with which the joint is to be finally assembled. Finally, torque is applied to the wrenching configuration on the collar portion so that at the predetermined torque, the collar portion ruptures leaving the joint assembled with its predetermined torque.

For a better understanding of the present invention, together with other and further objects thereof, reference is made to the following description taken in connection with the accompanying drawings, and its scope will be pointed out in the appended claims.

Figure 1:
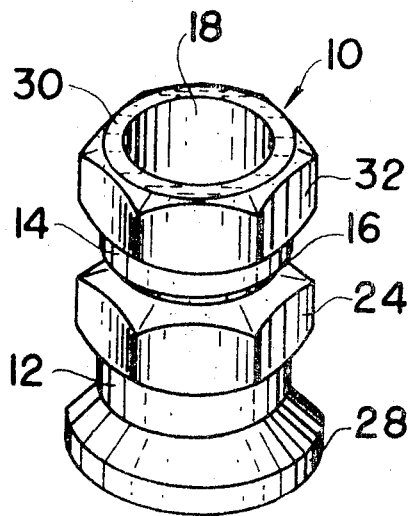
FIG. 1 is a perspective view of a nut in accordance with this invention.
Figure 2:
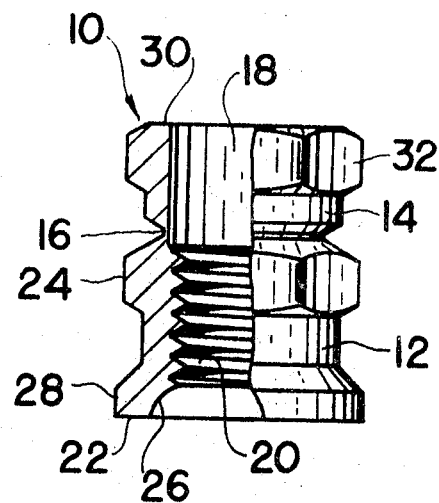
FIG. 2 is an elevation of the nut illustrated in FIG. 1 with a portion broken away to show the bore of the nut.

Referring to FIGS. 1 and 2 of the drawing, a preferred embodiment of a nut 10 in accordance with the invention is illustrated and comprises a nut portion 12 and a collar portion 14 connected by a weakened neck 16. Neck 16 is formed by a groove in the outer surface of the nut at the intersection of the nut portion and the collar portion and is adapted to shear or rupture upon the application of a predetermined torque so that the nut portion and the collar portion are separated. The predetermined torque that ruptures neck 16 is equal to the desired torque with which the joint in which the nut is to be used is to be finally assembled. A central aperture 18 extends axially through nut portion 12 and collar portion 14 and includes a thread 20 in the nut portion.

Nut portion 12 cooperates with a male fastener in clamping a joint and, accordingly, includes a bearing face 22 and a wrenching configuration 24. In the embodiment illustrated herein, bearing face 22 is separated from threaded bore 20 by a counterbore 26 so that a deformable flange 28 is formed between bearing face 22 and threaded bore 20. The strength of flange 28 is in the range of 60 to 90 percent of the ultimate strength of threaded bore 20, wherein the ultimate strength of the threaded bore is the highest load which that section is capable of sustaining. Accordingly, as more fully explained in the co-pending application of William Matievich, Ser. No. 770,974, filed Oct. 28, 1968, the disclosure of which is incorporated herein, the flange will buckle at predetermined external loads and the nut may be utilized with shear bolts to absorb both eccentric and concentric loads and prevent abrupt failure of the joint. It should be understood, of course, that counterbore 26 and deformable flange 28 need not be utilized with this invention and that conventional bearing arrangements may be used. Also, while wrenching configuration 24 is illustrated as a hexagon formed on the outer surface of the nut, it should be understood that various other wrenching configurations may be used.

Collar portion 14 includes a free end face 30 at one end which surrounds central opening 18 and a wrenching configuration 32 is also illustrated as a hexagon formed on the outer surface of collar 14, but it should be understood that various other wrenching configurations may be used. In the embodiment illustrated herein, wrenching configuration 24 and wrenching configuration 32 are the same size hexagons and are aligned so that a deep socket tool fits over wrenching configuration 32 and around wrenching configuration 24 to apply torque to the latter. When torque is to be applied to wrenching configuration 32, a shallow socket tool may be utilized.

Figure 3:
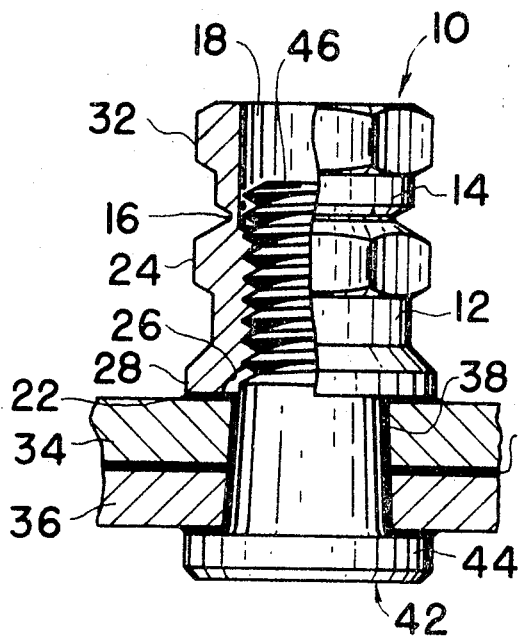
FIG. 3 is a view partly in section showing a joint prior to final assembly with the nut of FIG. 1; and, FIG. 4 is a view similar to FIG. 3, but showing the finally assembled joint.
Figure 4:
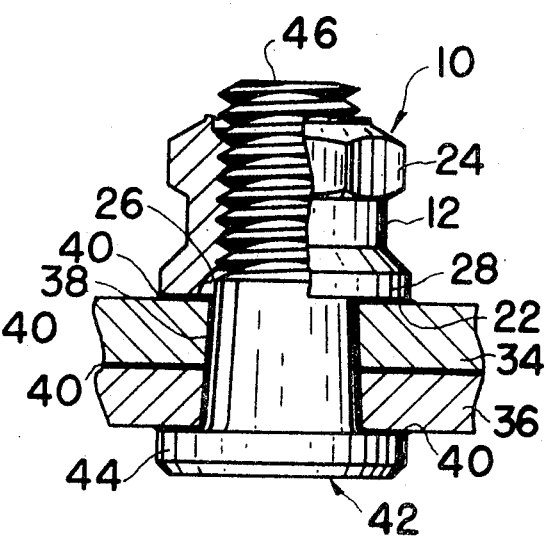

The use of nut 10 to assemble a joint in accordance with this invention will be explained with reference to FIGS. 3 and 4 where there is shown a pair of workpieces or panels 34 and 36 in face-to-face relationship to form a stack. Each of the workpieces includes an aligned aperture forming an opening 38 extending through the stack. Located between the faying surfaces of panels 34 and 36 is a suitable sealant 40 which may comprise a rubber type or similar compound. Initially, sealant 40 is located between the panels and may be located on the surface of opening 38 and the outside surfaces of the stack. A male fastener 42 in the form of a bolt is inserted in aperture 38 so that the head 44 bears on the outside surface of panel 36 and so that the threaded portion 46 projects beyond the outside surface of panel 34. Nut 10 is placed over the end of threaded portion 46 and a suitable tool, for example, the deep-socket type referred to previously, is applied to wrenching configuration 24 and actuated to apply an initial torque to the nut to clamp the joint. The initial torque applied by the tool is substantially higher than the predetermined torque with which the joint is to be finally assembled, that is, the torque required to induce the desired clamp load in the joint. Thereafter, the joint is allowed to relax and settle over a period of time so that the sealant will flow into intimate engagement with the fasteners and joint under the influence of the clamp load induced by the initial torque. During the settling period, movement of the panels and the sealant will reduce the prevailing torque between nut 10 and bolt 42 to a point below the predetermined torque with which the joint is to be assembled and so that the clamp load drops below the desired clamp load to be induced in the joint. Finally, a suitable tool, for example, the shallow-socket type previously referred to, is placed over wrenching configuration 32 on collar portion 14 and is actuated to the predetermined torque required to induce the desired clamp load in the joint, which torque is equal to that required to rupture neck 16. At this point, neck 16 breaks, collar 14 separates from nut portion 12 and the joint is fully assembled as clearly shown in FIG. 4.

From the preceding description, it should be clear that since the initial torque is higher than the predetermined torque required to induce the desired clamp load, all of the sealant flow occurs before the final tightening of the joint. Accordingly, the desired clamp load induced in the joint upon final torquing of the collar portion is not lost and the strength of the joint is maintained.

While there has been described what is at present considered to be a preferred embodiment of this invention, it will be obvious to those skilled in the art that various changes and modifications may be made therein without departing from the invention and it is, therefore, aimed to cover such changes and modifications as fall within the true spirit and scope of the invention.

What is claimed is:

1. A method of assembling a joint comprising:
providing a stack of workpieces having aligned apertures formed therein to form an opening and having a sealant interposed between adjacent faces of said workpieces and about said opening;
inserting a male fastener into said opening so that the head of said male fastener bears on a first outside surface of said stack and so that a threaded portion of the shank of said male fastener projects beyond the second outside surface of said stack; and
providing a nut having a nut portion and a collar portion, said nut portion and said collar portion being joined together by a neck adapted to rupture at a predetermined torque, placing said nut on said threaded portion of said shank and applying an initial torque to said nut portion, allowing said joint to set so that said sealant redistributes itself under the load imposed by said nut and, thereafter, applying said predetermined torque which is lower than said initial torque to said collar portion and rupturing said neck so that said nut portion and said collar portion separate.

* * * * *